June 23, 1959 C. L. KNOTT ET AL 2,891,266
LASTING MACHINES
Filed April 1, 1957  8 Sheets—Sheet 1

Inventors
Clyde L. Knott
Emile A. Deschenes
By their Attorney
Thomas J. Ryan

June 23, 1959  C. L. KNOTT ET AL  2,891,266
LASTING MACHINES

Filed April 1, 1957  8 Sheets-Sheet 3

*Inventors*
Clyde L. Knott
Emile A. Deschenes
By their Attorney
Thomas J. Ryan

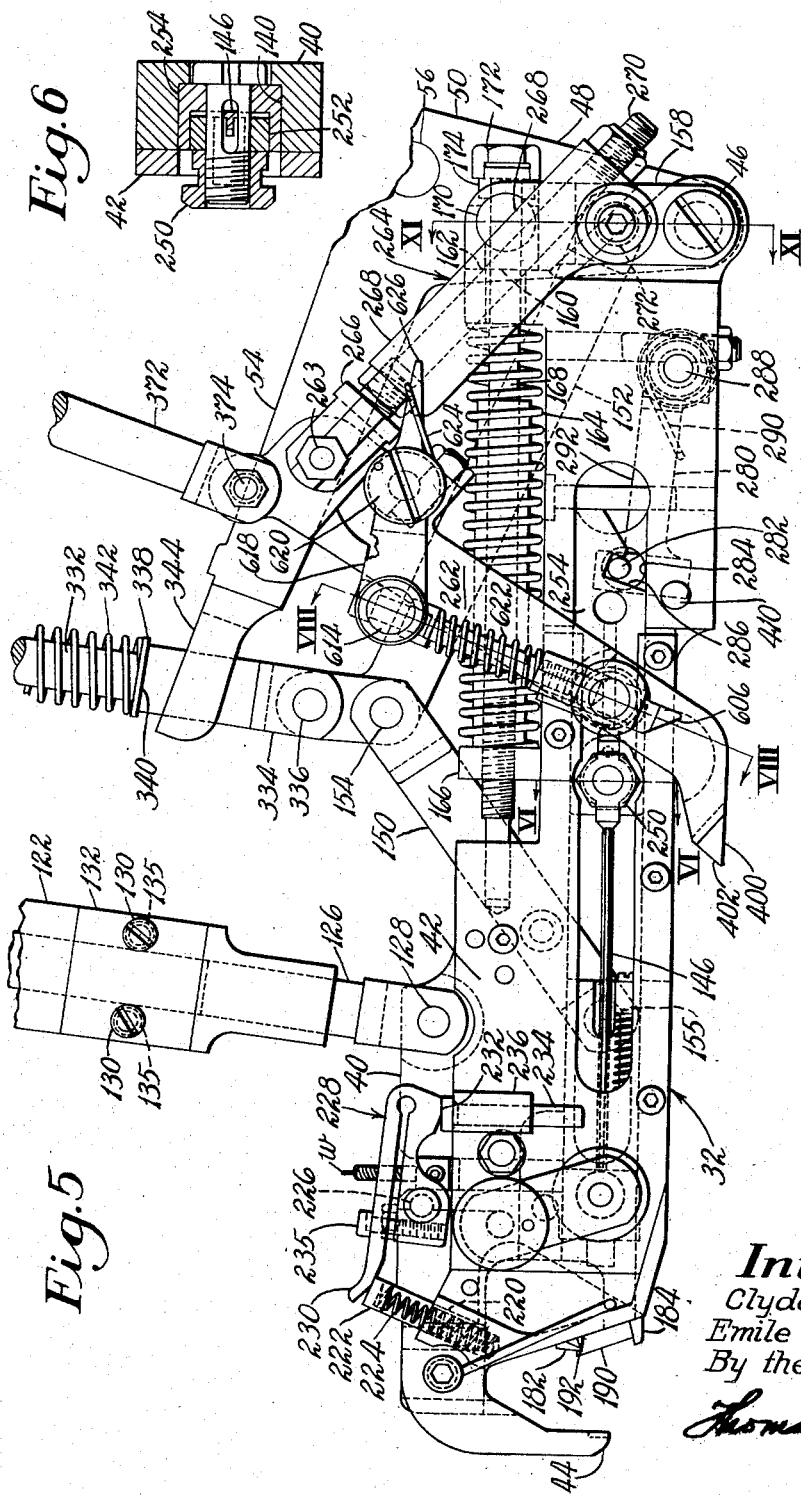

June 23, 1959  C. L. KNOTT ET AL  2,891,266
LASTING MACHINES
Filed April 1, 1957  8 Sheets-Sheet 5

*Inventors*
Clyde L. Knott
Emile A. Deschenes
By their Attorney
Thomas J. Ryan

June 23, 1959   C. L. KNOTT ET AL   2,891,266
LASTING MACHINES

Filed April 1, 1957   8 Sheets-Sheet 8

Inventors
Clyde L. Knott
Emile A. Deschenes
By their Attorney
Thomas J. Ryan

United States Patent Office 2,891,266
Patented June 23, 1959

2,891,266

LASTING MACHINES

Clyde L. Knott, Beverly, and Emile A. Deschenes, Danvers, Mass., assignors to United Shoe Machinery Corporation, Flemington, N.J., and Boston, Mass., a corporation of New Jersey Application April 1, 1957, Serial No. 649,950

26 Claims. (Cl. 12—12.21)

This invention relates to lasting machines, and more particularly to machines for lasting the toe ends of welt shoes. In United States Letters Patent No. 2,638,610, granted on May 19, 1953, on an application filed in the name of Philip E. Burby, there is disclosed, in a power operated toe lasting machine, automatic means for applying a toe binder about the toe end of a welt shoe to hold the upper in lasted position, and means for fastening the binder by driving staples through the margin of the upper and a lip on the insole at the opposite sides of the shoe bottom, this particular automatic means representing a further development of, and improvement over, an earlier arrangement for this same purpose disclosed in United States Letters Patent No. 2,420,684, granted May 20, 1947, on an application filed in the name of Charles A. Robinson. It is an object of the present invention to provide still further improvements in the binder applying and fastener inserting means, and the invention is therefore illustrated as embodied in a machine of the type disclosed in the mentioned Burby patent. However, it will, of course, be understood that in various novel aspects the invention is not limited to the specific mechanical construction hereinafter described or to embodiment in that exact kind of toe lasting machine.

In common with the machine of the Burby patent, the herein illustrated machine has a pair of toe embracing wipers for wiping the marginal material of the toe end of a welt shoe upper heightwise around the toe end of its last and then inwardly over the feather and against the lip of the insole, binder applying means including a pair of grippers, one on each side of the shoe being lasted, adapted to be operated in predetermined time relation to the action of the aforementioned wipers to draw a toe binder, previously fed around the toe end of the shoe and severed at one end after being seized by the grippers, snugly against the upstanding margin of the upper to hold it in lasted position against the insole rib, and a fastener inserting mechanism on each side of the shoe for driving a fastening, i.e., a staple, through the margin of the upper and lip of the insole.

With the prior arrangement of the Burby machine, after the fastener inserting mechanisms have been operated to secure the binder to the shoe in the manner set forth above, the grippers which have been applying a pull on the binder are opened, and as they thus release the binder these grippers are moved quickly away from the binder and in a direction extending lengthwise of the shoe thereby leaving the gripped end portions of the binder extending rearwardly from the staples by means of which the binder is secured to the shoe. This extra length of the binder serves no useful purpose after the staples have been driven and the binder applying grippers opened, and, especially where the binder is formed of non-metallic plastic material which is quite stiff and resilient, these loose ends are rather troublesome to the operator during the subsequent inseaming operation. With the view of avoiding this difficulty, or the need for severing these loose ends as a separate operation, the herein illustrated machine is, in accordance with a feature of the invention, provided with improved fastener inserting mechanisms each of which is provided with means adapted to sever the toe binder in a location closely adjacent to the point where it is secured to the shoe. More specifically, each of these improved fastener inserting mechanisms which has a fastener inserting driver, a throat member through which the driver operates, means for operating the driver and a pair of binder positioning members, is further provided with a knife carried by one of the binder positioning members and arranged to be actuated by the driver operating means for severing the binder in a location closely adjacent to the point where it is secured to the shoe by the fastener.

With a view of simplifying the mechanical construction and also of improving the operation of the binder applying grippers, each of which is carried on a supporting member mounted for movement in a direction extending lengthwise of the shoe to cause the gripper to draw the binder against the upstanding margin of the upper material, these grippers are each provided with a novel means for mounting it on its associated supporting member with the operative end of the gripper spaced outwardly from the side of the shoe and which is adapted to cause the gripper to move inwardly toward the side of the shoe in response to the pull the gripper is applying to the binder. More particularly, each of the binder applying grippers is mounted on its supporting member by means of a pair of parallel links which provide a toggle action for causing the gripper to be moved inwardly against the resistance of a spring means which tends to hold the gripper yieldingly away from the side of the shoe. In addition, means are also provided for subsequently moving the binder applying grippers outwardly away from the side of the shoe in predetermined time relation to the inward movement of members associated with the fastener inserting mechanism. More particularly, it will be understood that each of the fastener inserting mechanisms is provided with members, including a throat portion and a pair of binder locating fingers, which are moved inwardly toward the side of the shoe to engage the binder and force it into contact with the upstanding margin of the upper materials. In order to facilitate this action, the means for moving the binder applying grippers outwardly are adapted to be actuated in predetermined time relation to the inward movement of the aforementioned fastener inserting mechanism members so that the binder on each side of the shoe is moved outwardly to a more advantageous position in which to be picked up by the throat portion and binder locating fingers of the fastener inserting mechanism and as it is moved inwardly against the resistance set up by the means which yieldably moves the grippers outwardly, the binder is held under tension and thus is tightly applied to the shoe.

The above and other objects and features of the invention will appear in the following detailed description of the preferred embodiment thereof which is illustrated in the accompanying drawings and will be pointed out in the claims.

In the drawings,

Fig. 5 is a view in side elevation and at an enlarged scale of one of the improved fastener inserting mechanisms;

Fig. 6 is a view of a portion of the fastener inserting mechanism shown in horizontal section substantially on line VI—VI of Fig. 5 and looking in the direction of the arrows;

The machine which is herein illustrated is, except as will be noted below, substantially the same as the machine shown and described in detail in the above-mentioned patent to Burby. Accordingly, only so much of the machine is illustrated as is necessary for an understanding of the several novel features of the present invention, and reference may be had to the Burby patent for details of the machine not herein shown and described.

Figure 12:
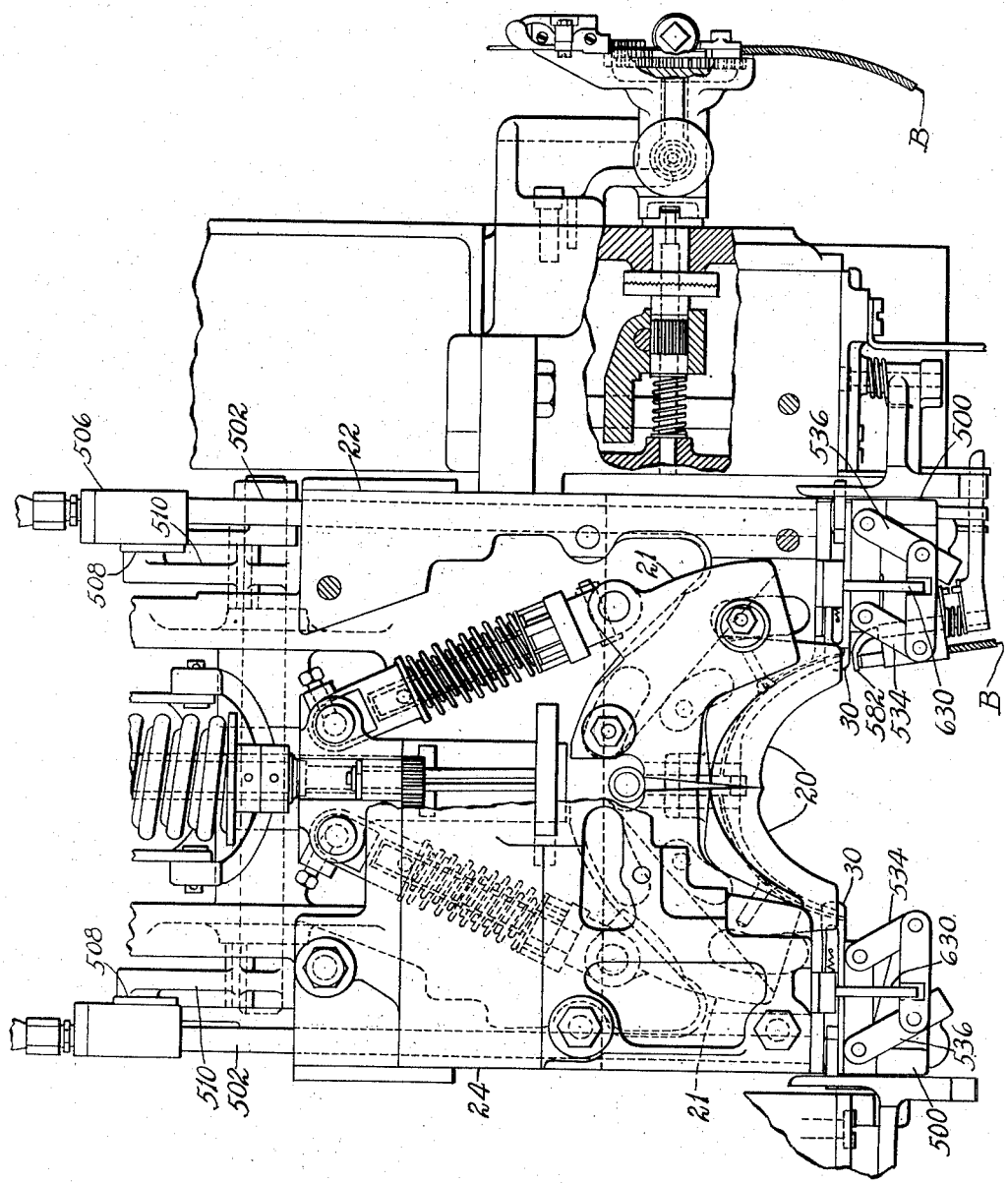
Fig. 12 is a plan view of a portion of the toe lasting machine with certain parts removed and showing the improved binder applying grippers with which the machine is provided.

Thus the illustrated machine is provided with a pair of wipers 20, 20, mounted on wiper holders 21, 21 which are associated with a wiper carrier 22 having a cover 24, Fig. 12, for wiping the upper materials of a shoe upwardly around the toe end of its last, in response to upward movement of the wiper carrier, and for thereafter wiping the lasting margin of the upper materials inwardly over the feather of an insole on the last and against the rib of the insole, in response to advancing and closing movements of the wipers, and for pressing the lasting margin against the feather on the insole, in response to downward movement of the wiper carrier, these wipers being operated by mechanism similar to that of the Burby machine. As is explained in detail in the Burby patent, after the wipers have wiped the marginal portion of the upper inwardly over the insole they are partially retracted lengthwise and widthwise of the shoe and are raised slightly to relieve their downward pressure on the upper, after which they are again moved downwardly to apply the final pressure to the upper. At this point the cycle of operation of the machine is automatically interrupted to permit a toe binder, which has just been applied to the toe end of the shoe by means of a pair of binder applying grippers, herein identified by the reference characters 30, 30, Fig. 12, which are operated in proper time relation to the above-mentioned movement of the wipers, to be fastened to the shoe during a pause in the cycle, by means of two fastener inserting mechanisms, herein indicated generally by the reference characters 32, 32, see Fig. 1, after which the machine is automatically set into operation to complete the operating cycle and to return the several operating elements to their starting positions.

Figure 1:
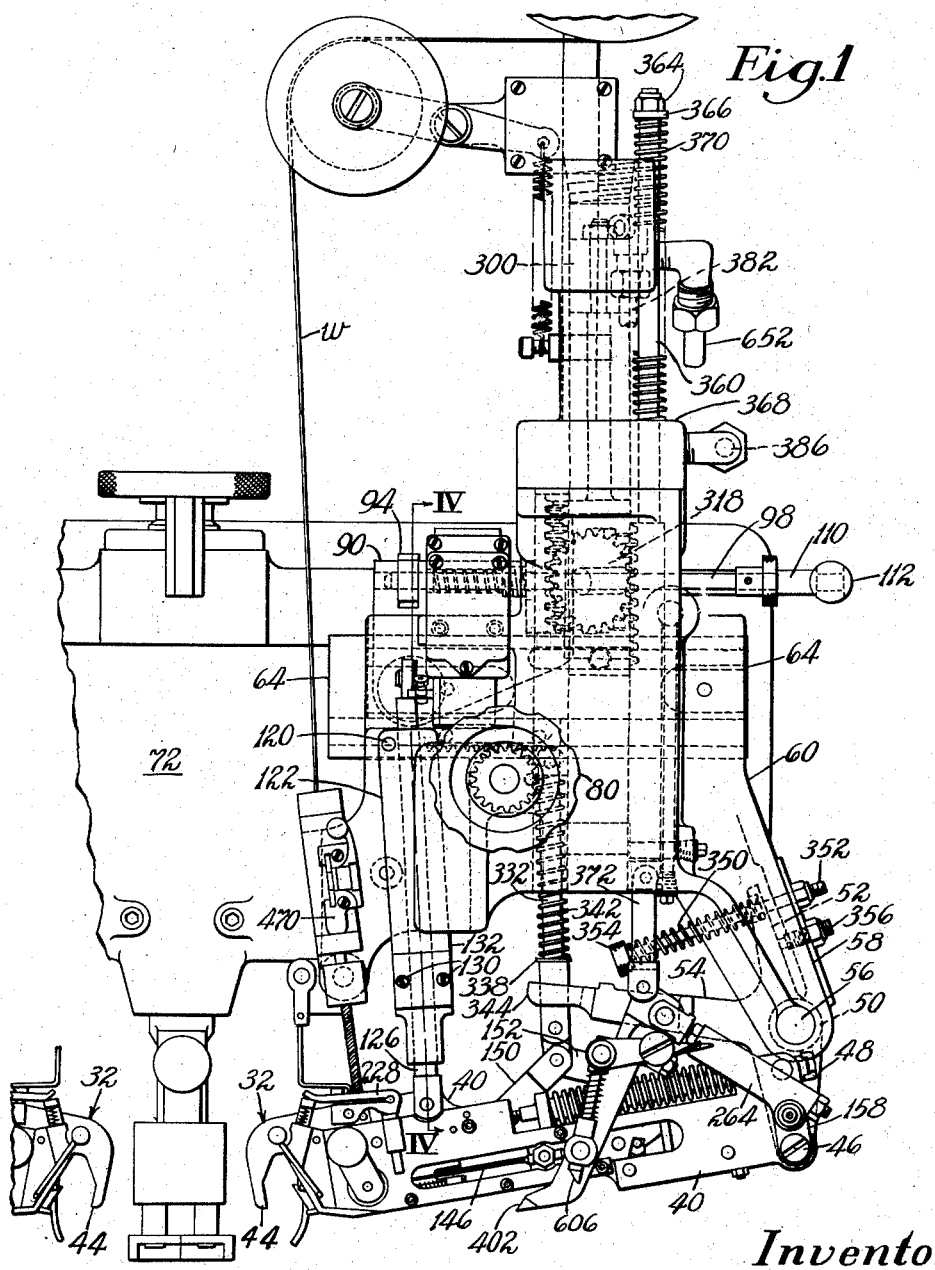
Fig. 1 is a view in front elevation of a portion of a toe lasting machine embodying the features of this invention and showing especially one of the improved fastener inserting mechanisms with which the machine is provided.

Referring first to the improved fastener inserting mechanisms, see especially Figs. 1 to 11, it will be understood, as has been previously suggested, that two of these mechanisms are provided, see Fig. 1, one for securing the binder to one side of the shoe and the other to secure the binder to the opposite side of the shoe. Inasmuch as these two mechanisms are of exactly the same construction, one being in effect the mirror image of the other, the following detailed description will be limited to the fastener inserting mechanism on the right-hand side of the machine which is illustrated in the present drawings. This mechanism comprises an elongated frame member 40, Figs. 5 and 7, to the left-hand portion of which there is secured a cover plate 42 and a downwardly projecting anvil portion 44. At its right-hand end this frame member is pivotally supported by means of a pivot pin 46, Fig. 11, to one arm 48 of a three-armed lever 50 having two other arms 52, 54, Fig. 1. This three-armed lever is, in turn, pivotally mounted, by means of a pin 56 on a downwardly projecting portion 58 of a carrier member 60.

Figure 4:
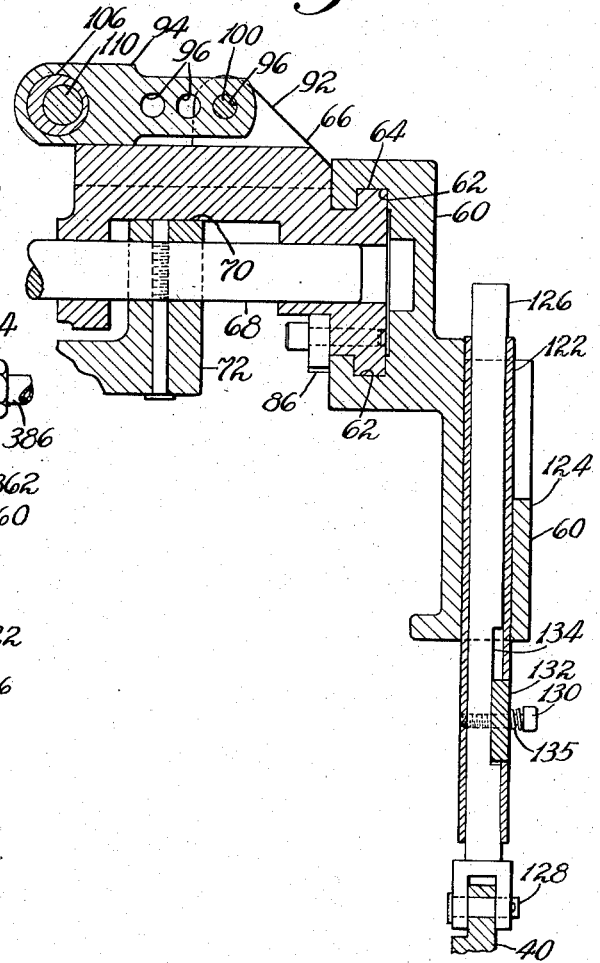
Fig. 4 is a view at an enlarged scale and in vertical section taken substantially on line IV—IV of Fig. 1 and looking in the direction of the arrows.

This carrier member is formed with guideways 62, 62, Fig. 4, by means of which it is mounted for sliding adjusting movements widthwise of a shoe in the machine on a guide portion 64, formed on a supporting bracket 66 which, in turn, is mounted for sliding adjusting movements lengthwise of a shoe in the machine by means including a stud 68 and a guide surface 70 formed on a portion 72 of the main frame of the machine. A screw 74, threaded into the frame portion 72 and extending through a washer 76 and a slot 78 in the bracket 66, Fig. 2, serves as an additional means for preventing rotation of the bracket and parts carried thereby in a counterclockwise direction as viewed in Fig. 1.

Figure 2:
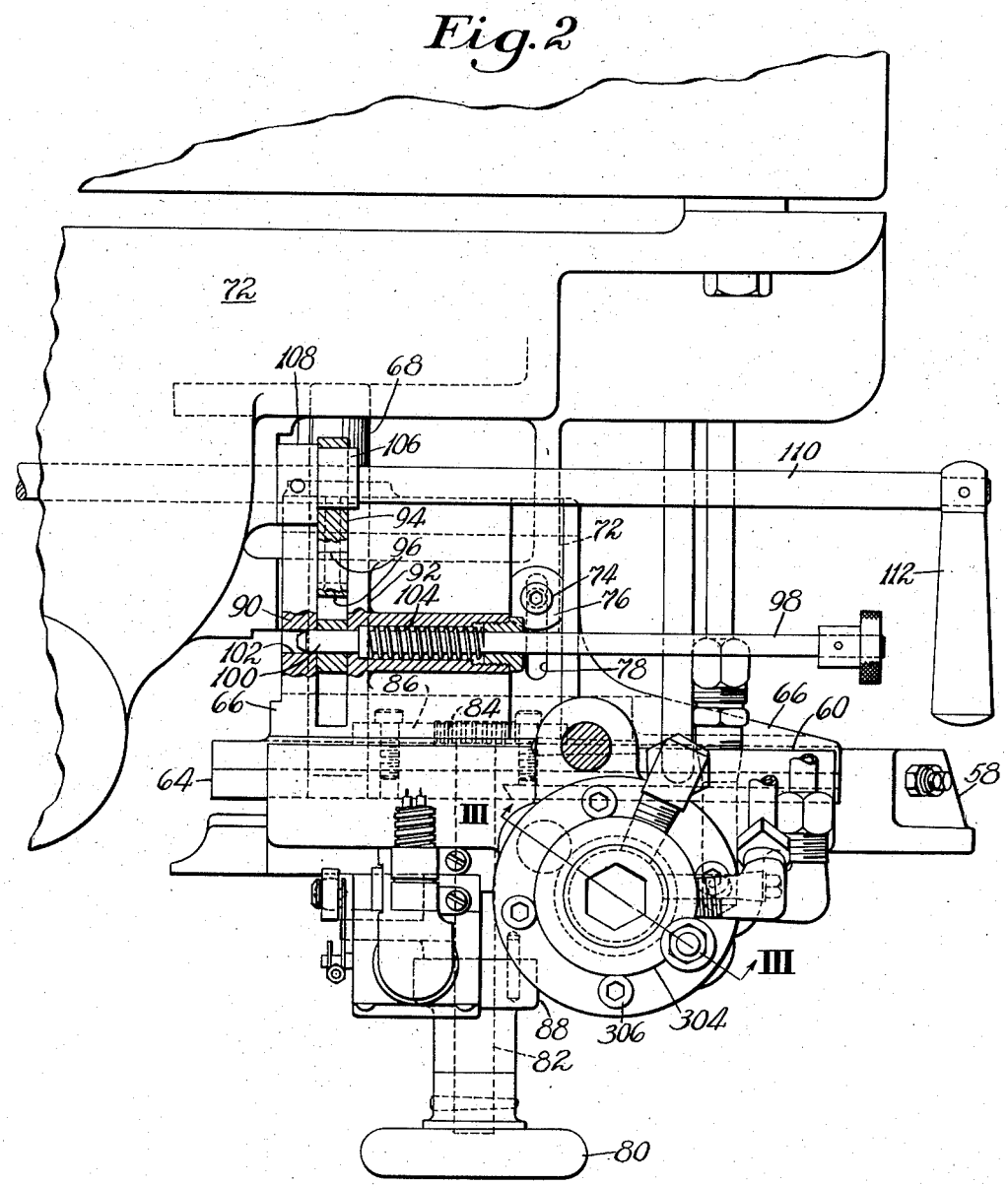
Fig. 2 is a plan view at a somewhat enlarged scale of that portion of the machine which is shown in Fig. 1.

For moving the fastener inserting mechanism in a direction widthwise of the shoe being lasted, a hand wheel 80 is provided, this hand wheel being secured to the outer end of a shaft 82, journaled in a portion of the carrier member 60 and carrying on its inner end a pinion 84, Fig. 2, which is in mesh with a rack 86 secured to the bracket member 66, Fig. 4. A split clamp 88, pinned to the carrier member 60, is arranged frictionally to engage the shaft 82 thereby to hold the carrier member 60 and hence the fastener inserting mechanism which is mounted thereon in any position of adjustment widthwise of the shoe to which it is moved by the hand wheel 80. Extending upwardly from the bracket member 66 are a pair of ears 90, 92 between which there is slidable a link 94, Fig. 2, provided with three spaced holes 96, Fig. 4. Slidably mounted in the ear 92 is a plunger 98 having a pilot end 100 which projects through one of the holes in the link and into a hole 102 formed in the ear 90 to connect the link to the bracket member 66. By withdrawing this plunger against the resistance of a spring 104, Fig. 2, and inserting its pilot end through one of the other holes 96 in the link 94, the bracket and parts carried thereby may be roughly adjusted in different positions lengthwise of the shoe being lasted. At its inner end, the link 94 is mounted on the eccentric portion 106 of a collar 108 which is fast on a shaft 110 journaled in the frame portion 72, Fig. 2. At its outer end, this shaft is provided with an operating handle 112 by means of which it may be rotated to effect a fine adjustment of the bracket member 66, together with the parts carried thereby, in a direction extending lengthwise of the shoe being lasted. As indicated in Fig. 2, the shaft 110 extends across to the other side of the machine where it is connected to the other fastener inserting mechanism carrying bracket, not shown.

Pivotally mounted on the front of the carrier member 60, by means of a pin 120, Fig. 1, is a guide member 122 a portion of which underlies a lip 124, formed on the carrier member, Fig. 4. Slidably mounted in this guide member is a rectangularly shaped bar 126 which at its lower end is connected by means of a pin 128 to the frame member 40 of the fastener inserting mechanism. Secured to the guide member 122, by means of screws 130, 130, Fig. 1, is a friction block 132 which is held yieldingly against the bottom surface 134 of a notch cut in the bar 126 by means of springs 135, Fig. 4. As will be readily understood, the pivotal movements of the frame member 40 of the fastener inserting mechanism about the pin 46, which occur during the operation of the machine, are stabilized by the action of the friction block 132 on the bar 126.

Figure 7:
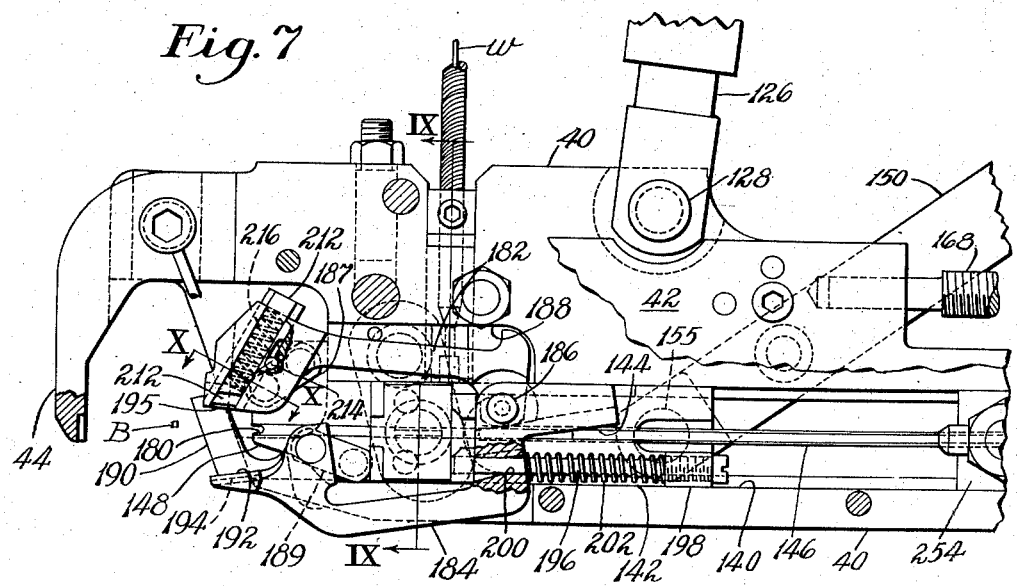
Fig. 7 is a view in side elevation of the left-hand portion of the fastener inserting mechanism illustrated in Fig. 5 shown at an enlarged scale and with some parts removed and others shown in vertical section.
Figure 9:
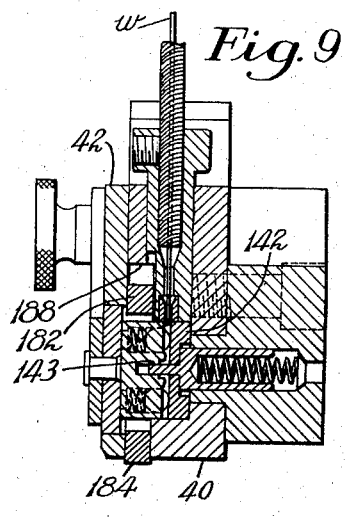
Fig. 9 is a view of another portion of the fastener inserting mechanism shown in vertical section substantially on line IX—IX of Fig. 7 and looking in the direction of the arrows.

Referring to Fig. 7, the frame member 40 of the fastener inserting mechanism illustrated therein has a guideway 140 within which there is mounted a slide 142, corresponding to the slide 448 of the machine of the above-mentioned Burby patent and which is adapted to serve as an outside former for forming a staple over an inside former 143, Fig. 9, this staple being formed from a piece of wire severed from a strand of wire w, generally in the same manner as in the Burby machine. The slide 142 is also provided with a driver passage 144 through which a driver 146 operates to drive the formed staple outwardly through a throat portion 148 on the left-hand side of the slide 142. Generally in the same manner as in the Burby machine this slide is moved to the left, Figs. 5 and 7, first to sever the piece of wire, next to form it into a staple, and finally to cause the throat portion 148 to engage a toe binder B, Fig. 7, and force it against the side of the shoe being lasted, by means of a toggle mechanism including two links 150 and 152 which correspond in function to the links 508 and 510 of the Burby machine, these links being joined together by a pin 154, Fig. 5.

Figures 10, 11:
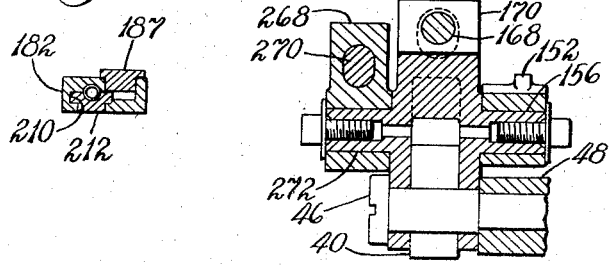
Fig. 10 is a view of another portion of the fastener inserting mechanism shown in horizontal section substantially on line X—X of Fig. 7 and looking in the direction of the arrows.
Fig. 11 is a view of still another portion of the fastener inserting mechanism shown in vertical section substantially on line XI—XI of Fig. 5 and looking in the direction of the arrows.

The link 150 is connected to the slide 142 by means of a pin 155, while the link 152 is pivotally mounted on a boss 156 formed on an abutment member 158 which, in turn, is pivotally supported on a reduced portion of the pivot pin 46, Fig. 11. The abutment member 158 is provided with a flat surface 160 which is held yieldingly in engagement with a surface 162, formed on the right-hand end of the frame member 40, Fig. 5, by means of a compression spring 164. This spring is interposed between an adjusting nut 166 and a shoulder on the frame member and surrounds a rod 168 which is threaded into the aforementioned nut at one end, while its other end projects through a trunnion shaft 170, journaled in the upper portion of the abutment member 158. Formed integrally with this end of the rod 168 is a hexagonal head 172 which is cut away so as to be interfitted with a thrust collar 174 the left-hand side of which is provided with a recess shaped to fit the cylindrical surface of the trunnion shaft 170. As will be apparent, by forcing the nut 166 to the right, Fig. 5, the rod 168 will be released for rotation by means of its hexagonal head 172 to vary the force of the spring 164, and upon release of the nut 166 the parts will be returned to the positions shown in Fig. 5 thereby holding the rod 168 against rotation. As will be apparent, when further movement of the slide 142 to the left, Fig. 7, is prevented as the result of the engagement of the throat portion 148 with the side of a shoe being lasted, before the toggle formed by the links 150, 152 has been fully straightened, spring 164 will yield to permit the abutment member 158 to swing in a clockwise direction, Fig. 5, this arrangement being generally similar in operation to the somewhat different construction provided in the Burby machine.

The improved fastener inserting mechanism herein illustrated is provided with means for locating the toe binder b in a proper position heightwise of the shoe being lasted and with relation to the throat portion 148, which, as shown in Fig. 7, is formed with a groove 180 for receiving the binder and holding it in position to be embraced by the staple, this locating means comprising a pair of fingers 182, 184 corresponding generally to the fingers 482, 484 of the Burby machine. These two fingers are pivoted together by means of a pin 186 and are received within a recess 188 formed in the frame member 40 behind the cover plate 42, Fig. 9. Adjacent to their left-hand ends, as viewed in Fig. 7, these fingers are connected to the throat portion of the slide 142 by means of toggle links 187, 189. Formed on the lower finger 184 is a portion 190 extending upwardly a short distance beyond the upper finger 182 and a laterally offset portion 192 in which there is a groove 194. The laterally offset portion 192 extends somewhat beyond the front edge of the upwardly extending portion 190 as does also a lower surface 195 on the finger 182. In addition to the links 187, 189, these fingers are supported on the slide 142 by means of a rod 196 which is mounted on an offset portion 198 on the slide 142 and which extends through an aperture 200 in the finger 184. Surrounding this rod and bearing at one end on the offset portion 198 and at its other end on the finger 184, is a compression spring 202, this spring tending to hold the fingers 182, 184 in the open positions in which they are shown in Fig. 7.

When the slide 142 travels to the left, after the piece of wire for the staple has been severed and while the staple is being formed and the throat portion moved toward the shoe, the fingers 182, 184 move with the slide until the front edge of the upwardly extending portion 190 on the finger 184 contacts the binder B, which at this time is being held under tension by the binder applying grippers, in a location spaced outwardly from the side of the shoe. Now, as the movement of the slide 142 is continued, these fingers will be closed, as a result of relative lengthwise movement between the slide and these fingers permitted by a yielding of the spring 202, until the surface 195 and the laterally offset portion 192 engage the binder and, by virtue of the action of the links 187, 189, position the binder in proper heightwise position to be received within the groove 180 in the throat portion 148. Thereafter, the throat portion and the closed fingers move in unison to force the binder firmly against the side of the shoe. It will be seen that the action of the fingers 182, 184 is substantially similar to that of the fingers 482, 484 of the Burby machine. However, in the herein illustrated arrangement, the throat member itself is adapted to engage the binder B and to force it against the side of the shoe. Thus there is no need to provide the fingers 182, 184 with guideways for the staple as it is driven.

Slidably mounted within a guideway 210, formed in the left-hand end of the finger 182, is a knife 212, Fig. 10, having a cutting edge at its lower end, this knife being normally held in an elevated position, as determined by a stop pin 214, by means of a spring 216, Fig. 7. Mounted in a guideway 220 formed in the cover plate 42 is a plungerlike member 222 which is normally held in the elevated position in which it is shown in Fig. 5 by means of a spring 224. Pivotally mounted on a pin 226, carried by the frame member 40, is a spring lever 228 having one end 230 bearing against the plungerlike member 222 and its other end 232 resting on the headed upper end of a pin 234 which is slidably mounted in a boss 236, formed on the cover plate 42. A screw 235 is provided for adjusting the end 230 of the lever 228 relatively to the end 232. When the slide 142 has completed its movement to the left, Fig. 7, and while the binder B is held against the shoe by the throat portion 148 and the fingers 182, 184, during the driving of the staple, the plunger 222 is directly over and in alinement with the knife 212. Thereafter, and as will be pointed out in more detail below, after the driving of the staple by the driver 146, the pin 234 is elevated to cause, through the action of the spring lever 228 and plungerlike member 222, the knife to sever the binder B in a location closely adjacent to the point where it is secured to the shoe by the driven staple, the cutting edge of the knife 212 passing entirely through the binder and into the groove 194 which is formed in the laterally offset portion 192 of the finger 184.

The driver 146 is connected by means of a nut 250 and a clamp block 252 to a driver slide 254, Fig. 6, which is mounted in the guideway 140 of the frame member 40, Fig. 5. Formed integrally with this slide and projecting laterally therefrom is a stud 260 on which there is pivotally mounted the lower end of a toggle link 262, Fig. 8. At its upper end, this link is connected by a pin 263 to the upper end of a second toggle link indicated generally by the reference character 264 and comprising an upper portion 266 which is adjustably connected to a lower portion 268 by means including an adjusting screw 270. The lower portion of the link 264 is pivotally mounted on a boss 272 formed on the abutment member 158, Fig. 11. Movement of the driver slide 254 is at times prevented by a latch arm 280, carrying a pin 282 which projects laterally from the outer end of the arm through a clearance hole 284 in the frame member 40 and into a notch 286 in the driver slide 254. The arm 280 is pivotally mounted on a stud 288 carried by the frame member, and is yieldingly urged in a clockwise direction, to hold the pin 282 in the notch 286, by means of a spring 290. The arm 280 has an abutment surface 292 which lies directly below the link 152, associated with the throat carrying slide 142. Thus, when the toggle which is formed by the two links 150, 152 is straightened, the arm 280 will be swung downwardly thereby removing the pin 282 from the notch 286 and releasing the driver slide 254.

Figure 3:
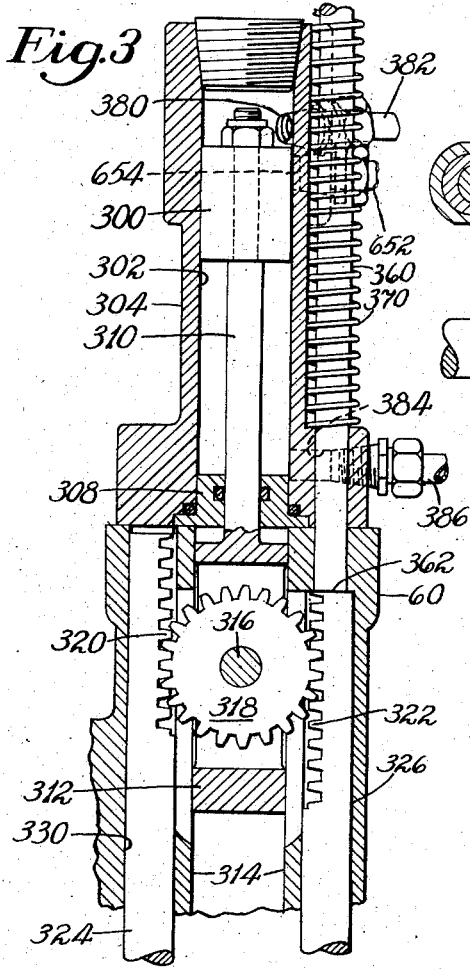
Fig. 3 is a view in vertical section substantially on line III—III of Fig. 2 and looking in the direction of the arrows.

In the herein illustrated machine, the two toggles formed, respectively, by the links 150, 152 and links 262, 264 are straightened to operate the throat carrying slide 142 and the driver slide 254 by means of a single fluid pressure operated piston 300, Figs. 1 and 3. This piston is slidable within a bore 302, formed in a cylinder 304 which is secured to the upper portion of the carrier member 60 by means of screws 306, see Fig. 2. Connected to this piston and extending through a closure member 308 at the lower end of the cylinder is a piston rod 310 formed at its lower end as a yoke 312 which is slidably mounted between opposite guide surfaces 314, 314 on the carrier member 60. Journaled on a cross shaft 316 and extending outwardly beyond the opposite sides of the yoke portion 312 of the piston rod 310 is a pinion 318 which is in mesh with rack teeth 320, 322 cut, respectively, on two plungers 324, 326.

The plunger 324 is slidable within a bore 330 formed in the carrier member 60 and has pivotally connected to its lower end the upper end of a link 332, Fig. 1. At its lower end, this link is enlarged to provide a bifurcated portion 334 for connection to the upper end of the link 152 by means of a pin 336, Fig. 5. Interposed between a thrust washer 338, which is in engagement with a shoulder 340 adjacent to the lower end of the link 332 and the lower end of the plunger 324, is a compression spring 342. The arm 54 of the three-armed lever 50, mentioned above, has a bifurcated end 344 which embraces the lower portion of the link 332, Fig. 5, directly beneath the washer 338, see also Fig. 1. A coil spring 350, which surrounds an adjustable abutment screw 352, having a knurled head 354, is adapted to engage the arm 52 of the lever 50 and thus hold this lever yieldingly in the angular position shown in Fig. 1 and as determined by an adjustable stop screw 356.

The plunger 326 has a portion of reduced diameter 360 which extends upwardly beyond a shoulder 362 and through alined bores in the carrier member 60 and cylinder 304, Fig. 3. At the upper end of this reduced portion of the plunger 326 is a stop nut 364 and a washer 366, Fig. 1, and interposed between this washer and a shoulder 368 on the cylinder 304 is a compression spring 370. Connected to the lower end of the plunger 326 is the upper end of a link 372 which is connected at its lower end to the link 262, mentioned above, by means of a pin 374, Fig. 5. Operating fluid is admitted to the upper portion of the cylinder 304, through a port 380 and conduit 382, to move the piston downwardly and to the lower portion of the cylinder, through a port 384 and conduit 386, to move the piston upwardly. Control of the flow of operating fluid to and exhaust from these two ports, respectively, are controlled by means of a valve, not shown, which is exactly like the valve 772 of the Burby machine which, as pointed out in the Burby patent, is of the same construction as a corresponding valve shown for the same purpose in the above-mentioned Robinson patent. It will be noted, however, that the conduit 386 is connected to a port in the valve which corresponds to the port 548 of the Robinson valve, see Fig. 3a of the Robinson patent, while the conduit 382 is connected to a port corresponding to the port 532 of the Robinson valve, there being no port in the present valve corresponding to the port 530 of the Robinson valve inasmuch as but a single operating piston is employed.

As the piston 300 is moved downwardly, in response to the admission of fluid under pressure to the upper portion of the cylinder 304, the slide 142 is moved along to the left, Figs. 5 and 7, until a knife portion, not shown, on this slide engages the wire w whereupon the resistance set up is sufficient to cause the continued downward movement of the plunger 324 to swing the frame member 40 in a counterclockwise direction about the pivot pin 46, against the resistance set up by friction block 132, until the anvil 44 engages the insole of the shoe being lasted at a point located inwardly of the insole rib. During this action, movement of the plunger 326 is prevented by the action of the latch arm 280, pin 282 and notch 286, so that the pinion 318 acts as a differential device to transmit movement of the piston 300 exclusively to the plunger 324. Upon engagement of the anvil 44 with the insole, further downward swinging movement of the frame member 40 is prevented and as the toggle formed by the links 150, 152 is straightened by the downwardly moving plunger 324, the wire is severed, the staple formed and ultimately the binder B is forced against the side of the shoe by the throat portion 148 on the slide 142. Shortly after the staple has been formed and before the binder B is engaged by the locating fingers 182, 184, Fig. 7, the fastener inserting unit is moved to the right, through the action of the spring 342, which is very much stronger than spring 350, on the bifurcated portion 344 of the arm 54 of the three-armed lever 50, until the anvil is brought outwardly against the inside of the insole rib. Now, during the continued downward movement of the link 332, as the toggle formed by the links 150 and 152 is fully straightened, the spring 342 yields to hold the anvil firmly against the rib.

Just as the toggle formed by the links 150, 152 is fully straightened, the arm 280 is swung downwardly to withdraw the pin 282 out of the notch 286 thus releasing the driver slide 254. Further downward movement of the plunger 324 is now prevented by the engagement of this pin with the lower side of the hole 284 in the frame member 40 so that the pinion 318 now acts as a differential device to transmit the continued movement of the piston 300 to the plunger 326. The driver slide is now actuated to drive the previously formed staple by means of the driver 146, through the throat portion 148, as the result of the straightening of the toggle formed by the links 262, 264. At its lower end, the link 262 is formed with an offset end 400 having an abutment surface 402 which is adapted to engage and to lift the pin 234, substantially at the time the toggle formed by the links 262, 264 is fully straightened so that the knife 212 is operated to sever the binder B. It will be understood that the arrangement is such that the staple is driven and clenched before this toggle has been fully straightened and it is during this final straightening of the toggle that the knife 212 is operated, spring 164 now yielding to permit this action after movement of the driver has been arrested.

When the toggle formed by the two links 262, 264 has been fully straightened, as determined by the engagement of the link 262 with a stop pin 410 carried by the frame member, Fig. 5, pressure of the operating fluid will build up in the cylinder 304 and in conduit 382 and, as will be understood by reference to the Burby patent, because of this building up of the pressure of the fluid, the control valve, not shown, will be released for return to its original position, and when this valve is in its original position the upper portion of the cylinder 304 will be connected to exhaust and fluid under pressure will be admitted to the lower part of this cylinder for elevating the piston 300 to its initial position, as shown in Fig. 3. Such upward movement of this piston returns the fastener inserting mechanism to its starting position, Figs. 1 and 5, and during this return movement another portion of the wire w is fed into position for the formation of the next staple by means of wire feeding mechanism not here described but which is similar to that provided in the Burby machine and which includes a spring controlled brake member 470, Fig. 1, corresponding in function to the member 724 of the Burby machine. This feeding of the wire w is, however, greatly facilitated by the action of the friction block 132 inasmuch as the resistance to upward and downward movement of the fastener inserting mechanism 32 provided by the friction block assures, on the one hand, that the wire will be firmly gripped by a cutting edge of a portion of the fastener forming mechanism before the frame member 40 is moved downwardly and, on the other hand, that the toggles formed by links 150, 152 and 262, 264 will be fully broken and the slide 142 and driver 146 fully retracted before the frame member 40 is moved upwardly. Therefore, a more positive feeding of the wire w during downward movement of the frame member is provided and a proper measuring of the portion of the wire to be severed for the next staple is obtained during upward movement of the frame member which occurs only after the slide 142 and driver 146 have been fully retracted. When both of the two fastener inserting units with which this machine is provided have thus been returned to their original positions, the operating cycle of the lasting machine is again started, and during the completion of this operating cycle the various operating elements of the machine are returned to their starting positions in the same manner as in the Burby machine.

Referring to Fig. 12 of the drawings, there is a binder applying gripper on each side of the machine, and inasmuch as these grippers and the improved mechanical arrangement for mounting and actuating them are exactly alike, the following detailed description will be directed particularly to the gripper which appears on the right-hand side of Fig. 12 and which is shown in Figs. 13, 14, 15 and 16 of the drawings. However, before describing this gripper and its supporting mechanism, it may be noted that each of these grippers are associated with a supporting block 500 having a rearwardly extending rod 502 which is mounted for sliding movement in the wiper carrier 22 by means including anti-friction bearings 504, 504, Figs. 13 and 16. Secured to the outer end of each of these rods is a block 506 to which there is connected, by means of a link 508, an operating arm 510 which, at an appropriate time in the operating cycle of the lasting machine, is actuated by a cam, not shown, to move the rods 502 to the left, Fig. 16, through the action of a spring 512, this mechanism for operating the rods 502 being similar to that provided in the machine of the Burby patent, and the arms 510, mentioned above, corresponding to the arms 126 of the Burby machine, see Figs. 3 and 4 of the Burby patent.

Figure 13:
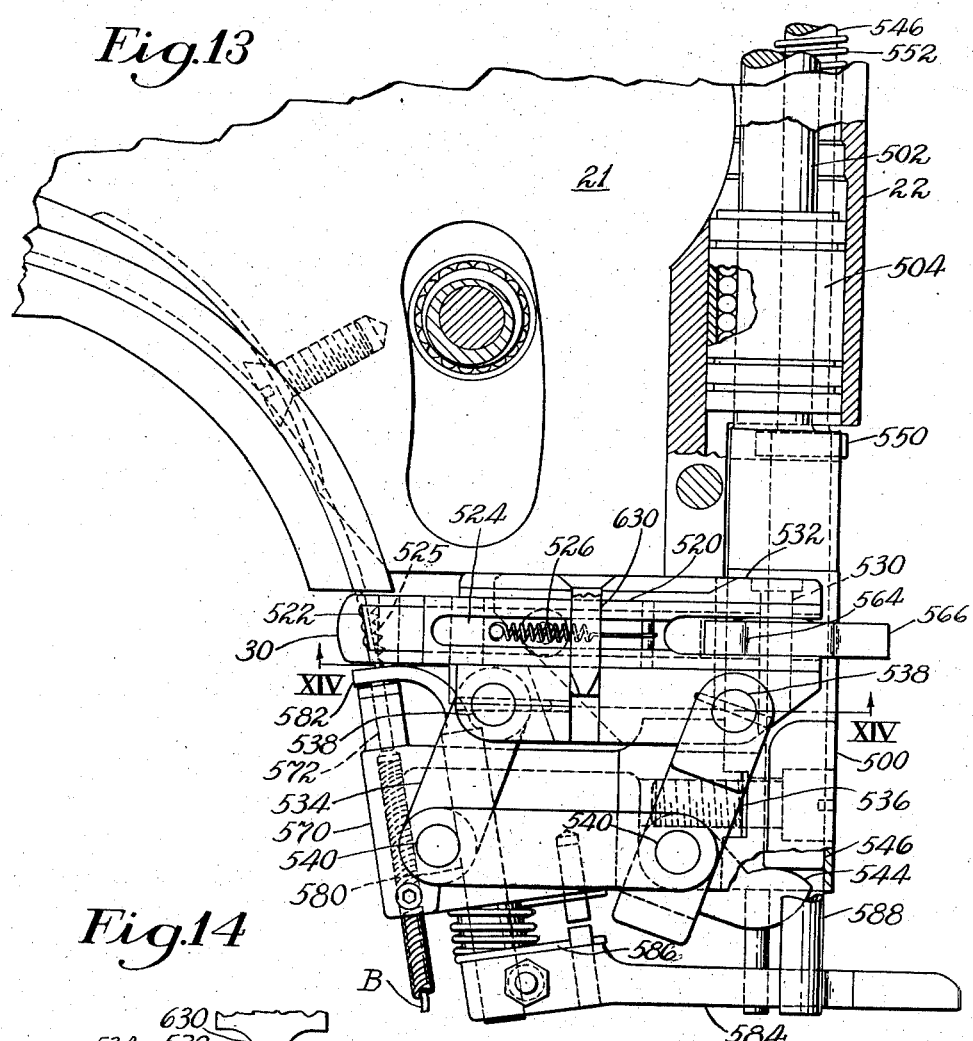
Fig. 13 is a plan view at an enlarged scale of one of these improved binder applying grippers, together with its mounting means.

As shown in Fig. 13, each gripper 30 includes a body portion 520 provided at its inner end with a toothed inner jaw 522 and slidably supporting an outer jaw 524 having teeth on its operating end and yieldingly urged away from the fixed jaw by a spring 526 so that the toe binder B may be fed through an opening 528 formed in the gripper body portion, and between the open jaws of the gripper, in the same manner and by means of mechanism not shown but which is similar to that of the Burby machine. The gripper 30 is pivotally mounted by means of a pin 530 in a gripper carrier 532 which is supported on the block 500 for movements extending widthwise of the machine and laterally of the shoe being lasted by means including a pair of parallel links 534, 536, Fig. 13. At their inner ends these links are journaled on trunnion pins 538, 538, and at their outer ends on trunnion pins 540, 540. The link 536 has an elongated hub portion 542 at its outer end, Fig. 15, which extends downwardly and is formed with an arm 544 which bears against the outer end of a plunger 546, Fig. 13. At its outer end this plunger is slidably received within a cylinder 548, Fig. 16, which is associated with the block 506, and interposed between the end of this cylinder and a thrust washer 550, fast on the plunger 546, is a compression spring 552, see also Fig. 13.

Figure 14:
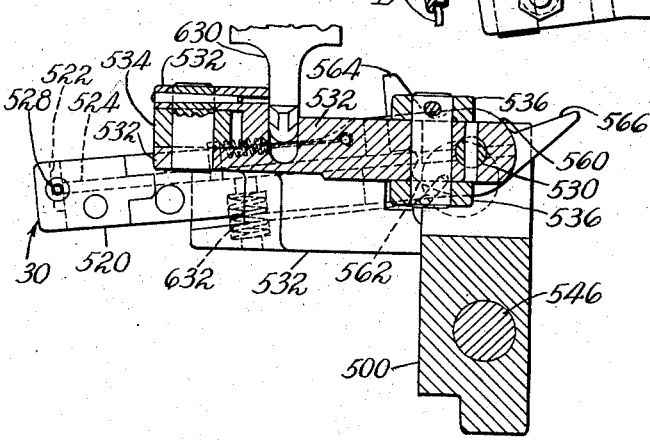
Fig. 14 is a view in vertical section of the improved binder applying gripper taken substantially on line XIV—XIV of Fig. 13 and looking in the direction of the arrows.
Figure 15:
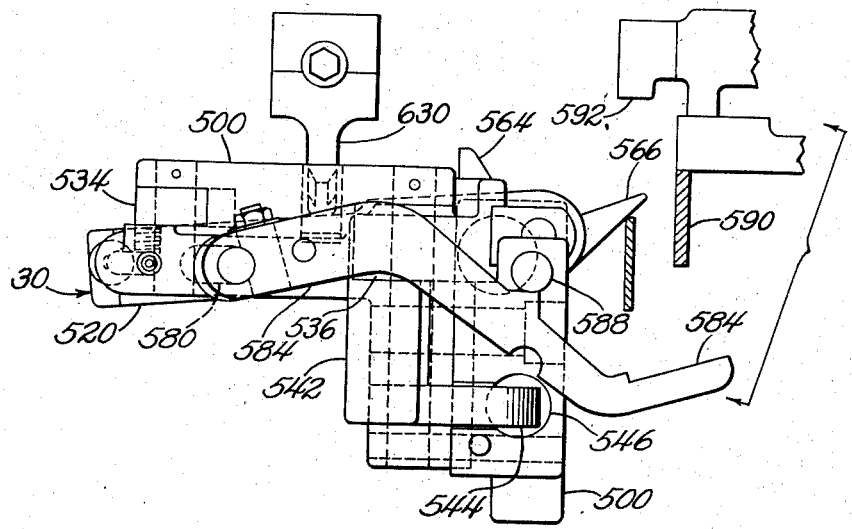
Fig. 15 is a view in front elevation of the improved binder applying gripper.

Also mounted on the pin 530 is a gripper jaw operating cam 560 having an eccentric operating surface 562, Fig. 14, and two radially extending ears 564, 566, this cam, of course, corresponding in function to the gripper operating cam 216 of the machine of the Burby patent, see Fig. 12 thereof. Formed on the supporting block 500 is an outstanding boss 570 in which there is a passageway 572 through which, at an appropriate time in the operating cycle of the machine, as is explained in the Burby patent, the toe binder B is fed around the toe end of the shoe and between the open jaws of the two grippers 30, 30. Pivotally mounted in the block 500 on a shaft portion 580 is a binder cut-off knife 582 having an operating arm 584 secured thereto. A coil spring 586 normally holds this knife with its cutting edge just below the passageway 572, through which the binder is fed, movement of the arm in a counterclockwise direction by the spring 586 now being arrested by a stop pin 588, Fig. 15. It will be understood, from the Burby patent, that during the initial upward movement of the wiper carrier 22, the toe binder B is fed around the toe end of the shoe and, as this upward movement of the wiper carrier is completed, the arm 584 will strike a fixed abutment 590 on the frame of the machine so that the knife 582 is operated to sever the toe binder. Also during this latter portion of the upward movement of the wiper carrier, the ear 566 on the binder gripper operating cam 560 will strike another fixed abutment 592 and as a result this cam will be rotated in a clockwise direction, Figs. 14 and 15, to cause the movable jaw 524 to grip the binder against the fixed jaw 522 of the gripper 30, Fig. 13.

Referring again to Figs. 5 and 8, there is rotatably mounted on the outer end of the stud 260, Fig. 8, a sleeve member 600 having a cross bore 602 in which there is rotatably mounted the shank portion 604 of a gripper release blade 606, this blade being held against rotation by means of a key 608. Threaded to the shank portion 604 is a rod 610 which extends through a bore 612 in a trunnion block 614 and which has an enlarged head portion 616 on its upper end. The trunnion block 614 is journaled in the bifurcated end of a lever 618 which is pivotally mounted on a screw stud 620 carried by the link 262, Fig. 5. A coil spring 622, surrounding the rod 610, tends to hold the head portion 616 of this rod against the trunnion block 614, while another coil spring 624 is arranged to swing the lever 618 yieldingly in a clockwise direction and to the extent permitted by the engagement of the blade 606 with the sleeve member 600, Fig. 8. When the toggle formed by the links 262, 266 approaches a fully straightened position, and just after the staple has been driven into the shoe, an end 626 on the lever 618 engages the pin 410, referred to above, so that this lever is rotated in a counterclockwise direction to project the gripper release blade 606 from the sleeve member 600. As this blade is thus projected, it will strike the ear 564 on the gripper operating cam 560 and rotate this cam in a direction to cause the gripper jaws to separate and release the toe binder.

Figure 8:
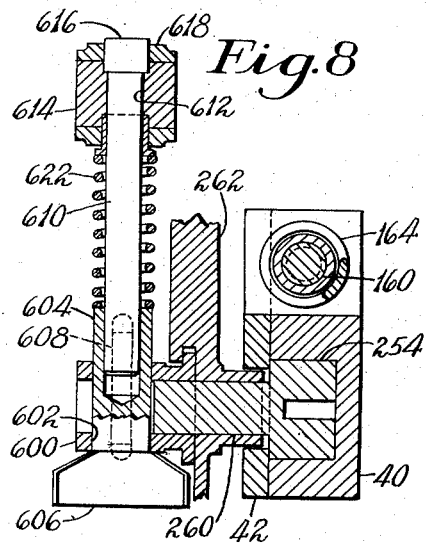
Fig. 8 is a view of a portion of the fastener inserting mechanism shown in vertical section substantially on line VIII—VIII of Fig. 5 and looking in the direction of the arrows.

As is shown in Figs. 12, 13 and 14, there are secured to the wiper carrier 22 two gripper locating fingers 630, 630 which correspond in function to the gripper locating fingers 206 of the machine of the Burby patent, see Figs. 8 and 12 thereof in which one of these locating fingers appears. These fingers serve to hold the grippers 30 in the positions shown in Figs. 12, 13 and 14, and, as will be understood by reference to the Burby patent, when the gripper supporting blocks 500 are moved downwardly, as viewed in Figs. 12 and 13, to cause the grippers to tension the toe binder which they have previously seized, these locating fingers are in effect withdrawn from engagement with the grippers. Now the grippers are released for upward movement under the influence of elevating springs, see spring 632, Fig. 14, and for inward movement toward the shoe in response to the pull exerted thereon by the toe binder as it is wrapped around the toe end of the shoe and against the resistance of springs 552, mentioned above, operating fluid in the cylinders 548 now exhausting into conduits 382 through suitable check valves, not shown. Because of the toggle effect produced by the tensioned binder and the links 534, 536, Fig. 12, the grippers will now assume positions spaced just slightly outward from the sides of the shoe. Thus, the outer end of the toe binder on each side of the shoe will be in a suitable location to be received between the anvil and throat portion of the fastener inserting device as it is moved downwardly into engagement with the shoe.

Figure 16:
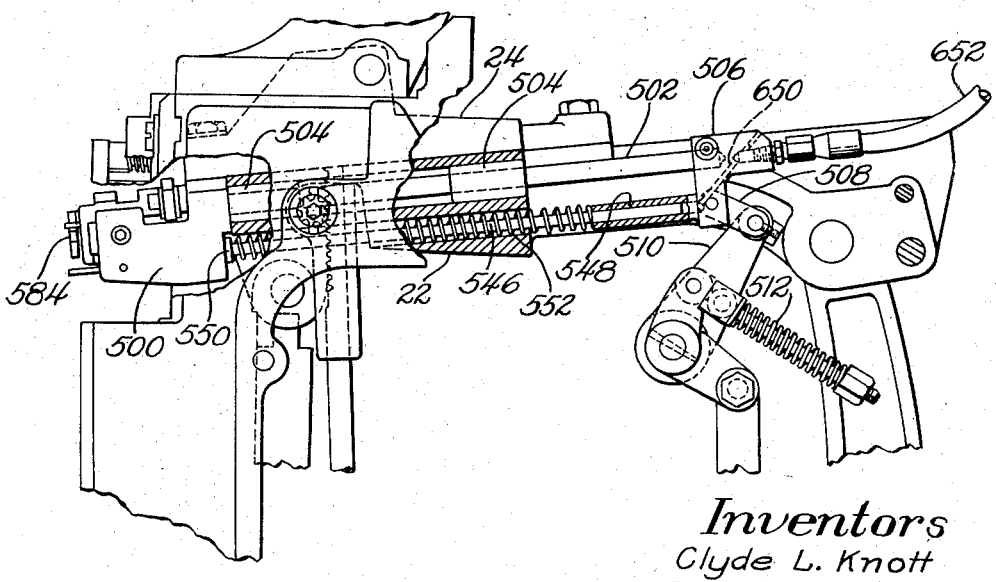
Fig. 16 is a view in side elevation of a portion of the machine with certain parts omitted and others broken away or shown in section to illustrate a portion of the mechanism provided for operating the binder applying grippers.

The cylinder 548, Fig. 16, on each side of the machine, is connected by means of a passageway 650 in the block 506 and a conduit 652 with a port 654 opening into the cylinder 304 on that side of the machine. Therefore, just as each of the pistons 300 begins its downward movement, in response to the admission of fluid under pressure to the cylinder 304 through the port 380, fluid under pressure will be admitted to the cylinders 548. As a result of admission of fluid under pressure to these cylinders, the plungers 546 will be projected forwardly, Fig. 16, and downwardly, Figs. 12 and 13, and the ends of these plungers acting on the arms 544 will tend to move the binder applying grippers 30 outwardly away from the opposite sides of the shoe. The timing is such that the fastener inserting devices are each moved downwardly into engagement with the shoe before the binder applying grippers are thus moved outwardly. As the locating fingers 182, 184 and throat portion 148, Figs. 5 and 7, are moved inwardly toward the shoe, the end portions of the toe binder will be located in a suitable heightwise position to be engaged by these fingers which as is explained above, are closed on the binder to bring it into a heightwise position in alinement with the groove 180 formed in the throat portion 148 of each fastener inserting mechanism. Hence, as the binder is now forced against the sides of the shoe by the inwardly moving locating fingers 182, 184 and throat portion 148, the binder applying grippers will be drawn inwardly against the resistance set up by the forces which are being applied thereto by the springs 552 and plungers 546. Thus, these grippers tend to bend the end portions of the toe binder, which extend lengthwise of the shoe, beyond the locations where the binder is being secured to the shoe, outwardly and away from the sides of the shoe. Also, the binder is held under considerable tension which causes it to be tightly applied to the shoe.

As has already been explained, just after the fastener inserting mechanism on each side of the shoe has been operated to drive a staple into the shoe for securing the toe binder thereto, the binder applying grippers are released, by the action of the gripper opening blades 606, Fig. 5, on the ears 564 of the gripper closing cams 560, Fig. 14, and the toe binder is severed by the action of the knives 212 in locations closely adjacent to the points where the binder is secured to the opposite sides of the shoe by the driven staples. The exact sequence of these actions is such that the binder applying grippers are opened to release their grip on the binder just after the staple has been driven and just before the aforementioned knives are operated. Immediately upon being opened to release their grip on the toe binder, the toe binder applying grippers are moved further outwardly away from the side of the shoe by the action of springs 552 and plungers 546, and are displaced further in a direction extending lengthwise of the shoe by the action of springs 512, Fig. 16. In this way, the end portions of the toe binder are withdrawn from the toe binder applying grippers before these end portions are severed by the knives 212.

Having thus described our invention, what we claim as new and desire to secure by Letters Patent of the United States is:

1. In a machine for lasting the toe end of a shoe having means for applying a binder around the toe end of the shoe being lasted and mechanism for inserting a fastener to secure the binder to the shoe, said mechanism including a fastener inserting driver, means for operating said driver, and means for severing said binder so positioned, relatively to said fastener inserting mechanism, as to sever the binder in a location closely adjacent to the point where it is secured to the shoe by said fastener.

2. In a machine for lasting the toe end of a shoe having means for applying a binder around the toe end of the shoe being lasted and mechanism for inserting a fastener to secure the binder to the shoe, said mechanism including a fastener inserting driver, means for operating said driver, means for severing said binder so positioned, relatively to said fastener inserting mechanism, as to sever the binder in a location closely adjacent to the point where it is secured to the shoe by said fastener, and means for operating said binder severing means immediately after said fastener has been inserted.

3. In a machine for lasting the toe end of a shoe having means for applying a binder around the toe end of the shoe being lasted and mechanism for inserting a fastener to secure the binder to the shoe, said mechanism including a fastener inserting driver, means for operating said driver, and means actuated by said driver operated means for severing said binder, said binder severing means being so located, relatively to the fastener inserting mechanism, as to sever the binder in a location closely adjacent to the point where it is secured to the shoe by said fastener.

4. In a machine for lasting the toe end of a shoe having means for applying a binder around the toe end of the shoe being lasted and mechanism for inserting a fastener to secure the binder to the shoe, said mechanism including a fastener inserting driver, means for operating said driver, and a knife for severing said binder so positioned, relatively to said fastener inserting mechanism, as to sever the binder in a location closely adjacent to the point where it is secured to the shoe by said fastener.

5. In a machine for lasting the toe end of a shoe having means for applying a binder around the toe end of the shoe being lasted and mechanism for inserting a fastener to secure the binder to the shoe, said mechanism including a fastener inserting driver, means for operating said driver, a knife operable in time relation to the operation of said driver for severing said binder, said knife being so located, relatively to said fastener inserting mechanism, as to cause the knife to sever the binder in a location closely adjacent to the point where it is secured to the shoe by said fastener, and means for operating said knife immediately after said fastener has been inserted.

6. In a machine for lasting the toe end of a shoe having means for applying a binder around the toe end of the shoe being lasted and mechanism for inserting a fastener to secure the binder to the shoe, said mechanism including a fastener inserting driver, means for operating said driver, a knife actuated by said driver operating means for severing said binder, said knife being so positioned, relatively to said fastener inserting mechanism, as to sever the binder in a location closely adjacent to the point where it is secured to the shoe by said fastener, and means for operating said knife immediately after said fastener has been inserted.

7. In a machine for lasting the toe end of a shoe having means for applying a binder around the toe end of the shoe being lasted and mechanism for inserting a fastener to secure the binder to the shoe, said mechanism including a fastener inserting driver, a throat member through which said driver operates, means for operating the driver, a pair of binder positioning members associated with said throat member, and means carried by one of said binder positioning members for severing the binder in a location closely adjacent to the point where it is secured to the shoe by the fastener.

8. In a machine for lasting the toe end of a shoe having means for applying a binder around the toe end of the shoe being lasted and mechanism for inserting a fastener to secure the binder to the shoe, said mechanism including a fastener inserting driver, a throat member through which said driver operates, means for operating the driver, a pair of binder positioning members associated with said throat member, means carried by one of said binder positioning members in a position for severing the binder in a location closely adjacent to the position where it is secured to the shoe by the fastener, and means for operating said binder severing means immediately after said fastener has been inserted.

9. In a machine for lasting the toe end of a shoe having means for applying a binder around the toe end of the shoe being lasted and mechanism for inserting a fastener to secure the binder to the shoe, said mechanism including a fastener inserting driver, a throat member through which said driver operates, means for operating the driver, a pair of binder positioning members associated with said throat member, and means carried by one of said binder positioning members and actuated by said driver operating mechanism for severing the binder in a location closely adjacent to the position where it is secured to the shoe by the fastener.

10. In a machine for lasting the toe end of a shoe having means for applying a binder around the toe end of the shoe being lasted and mechanism for inserting a fastener to secure the binder to the shoe, said mechanism including a fastener inserting driver, a throat member through which said driver operates, means for operating the driver, a pair of binder positioning members associated with said throat member, and a knife carried by one of said binder positioning members for severing the binder in a location closely adjacent to the point where it is secured to the shoe by the fastener.

11. In a machine for lasting the toe end of a shoe having means for applying a binder around the toe end of the shoe being lasted and mechanism for inserting a fastener to secure the binder to the shoe, said mechanism including a fastener inserting driver, a throat member through which said driver operates, means for operating the driver, a pair of binder positioning members associated with said throat member, a knife carried by one of said binder positioning member for severing the binder in a location closely adjacent to the point where it is secured to the shoe by the fastener, and means for operating said knife immediately after said fastener has been inserted.

12. In a machine for lasting the toe end of a shoe having means for applying a binder around the toe end of the shoe being lasted and mechanism for inserting a fastener to secure the binder to the shoe, said mechanism including a fastener inserting driver, a throat member through which said driver operates, means for operating the driver, a pair of binder positioning members associated with said throat member, and a knife carried by one of said binder positioning members and actuated by said driver operating means for severing the binder in a location closely adjacent to the point where it is secured to the shoe by the fastener immediately after said fastener has been inserted.

13. In a machine for lasting the toe end of a shoe, means for applying a toe binder around the toe end of a shoe being lasted including a gripper, a support for said gripper movable in a direction extending lengthwise of the shoe to cause the gripper to draw the binder against the upstanding margin of the upper to hold it in lasted position, and means for mounting said gripper on its support with its operative end spaced outwardly away from the side of the shoe, said mounting means including a pair of links providing a toggle action for causing the gripper to move inwardly toward the side of the shoe in response to the pull it is applying to the binder.

14. In a machine for lasting the toe end of a shoe, means for applying a toe binder around the toe end of a shoe being lasted including a gripper, a support for said gripper movable in a direction extending lengthwise of the shoe to cause the gripper to draw the binder against the upstanding margin of the upper to hold it in lasted position, means for mounting said gripper on its support for movement toward and away from the side of the shoe, and means for yieldingly urging the gripper outwardly away from the side of the shoe, said mounting means including a pair of links providing a toggle action for causing the gripper to move inwardly toward the side of the shoe in response to the pull it is applying to the binder.

15. In a machine for lasting the toe end of a shoe, means for applying a toe binder around the toe end of a shoe being lasted including a gripper, a support for said gripper movable in a direction extending lengthwise of the shoe to cause the gripper to draw the binder against the upstanding margin of the upper to hold it in lasted position, means for mounting said gripper on its support for movement toward and away from the side of the shoe, and spring means for yieldably urging the gripper outwardly away from the side of the shoe, said mounting means including a pair of links providing a toggle action for causing the gripper to move inwardly toward the side of the shoe in response to the pull it is applying to the binder.

16. In a machine for lasting the toe end of a shoe, means for applying a toe binder around the toe end of a shoe being lasted including a gripper, a support for said gripper movable in a direction extending lengthwise of the shoe to cause the gripper to draw the binder against the upstanding margin of the upper to hold it in lasted position, means for mounting said gripper on its support with its operative end spaced outwardly away from the side of the shoe, said mounting means including a pair of links providing a toggle action for causing the gripper to move inwardly toward the side of the shoe in response to the pull it is applying to the binder, and means for thereafter moving said gripper outwardly away from the side of the shoe.

17. In a machine for lasting the toe end of a shoe, means for applying a toe binder around the toe end of a shoe being lasted including a gripper, a support for said gripper movable in a direction extending lengthwise of the shoe, means for moving said support to cause the gripper to draw the binder against the upstanding margin of the upper to hold it in lasted position, means for mounting said gripper on its support for movement toward and away from the side of the shoe, means for yieldingly urging the gripper outwardly away from the side of the shoe, said mounting means being so constructed and arranged as to cause the gripper to move inwardly toward the side of the shoe in response to the pull it is applying to the binder, and means for thereafter moving said gripper outwardly away from the side of the shoe.

18. In a machine for lasting the toe end of a shoe, means for applying a toe binder around the toe end of a shoe being lasted including a gripper, a support for said gripper movable in a direction extending lengthwise of the shoe to cause the gripper to draw the binder against the upstanding margin of the upper to hold it in lasted position, means for mounting said gripper on its support for movement toward and away from the side of the shoe, means for yieldingly urging the gripper outwardly away from the side of the shoe, said mounting means including a pair of links providing a toggle action for causing the gripper to move inwardly toward the side of the shoe in response to the pull it is applying to the binder, and means for thereafter moving said gripper outwardly away from the side of the shoe.

19. In a machine for lasting the toe end of a shoe, means for applying a toe binder around the toe end of a shoe being lasted including a gripper, a support for said gripper movable in a direction extending lengthwise of the shoe, means for moving said support to cause the gripper to draw the binder against the upstanding margin of the upper to hold it in lasted position, means for mounting said gripper on its support for movement toward and away from the side of the shoe, spring means for yieldingly urging the gripper outwardly away from the side of the shoe, said mounting means being so constructed and arranged as to cause the gripper to move inwardly toward the side of the shoe in response to the pull it is applying to the binder, and means for thereafter moving said gripper outwardly away from the side of the shoe.

20. In a machine for lasting the toe end of a shoe, means for applying a toe binder around the toe end of a shoe being lasted including a gripper, a support for said gripper movable in a direction extending lengthwise of the shoe to cause the gripper to draw the binder against the upstanding margin of the upper to hold it in lasted position, means for mounting said gripper on its support for movement toward and away from the side of the shoe, spring means for yieldably urging the gripper outwardly away from the side of the shoe, said mounting means including a pair of links providing a toggle action for causing the gripper to move inwardly toward the side of the shoe in response to the pull it is applying to the binder, and means for thereafter moving said gripper outwardly away from the side of the shoe.

21. In a machine for lasting the toe end of a shoe, means for applying a toe binder around the toe end of a shoe being lasted including a gripper, mechanism for inserting a fastener to secure the binder to the shoe including members movable toward the shoe to urge the binder into engagement with the shoe, a support for said gripper movable in a direction extending lengthwise of the shoe, means for moving said support to cause the gripper to draw the binder against the upstanding margin of the upper to hold it in lasted position, means for mounting said gripper on its support with its operative end spaced outwardly away from the side of the shoe, said mounting means being so constructed and arranged as to cause the gripper to move inwardly toward the side of the shoe in response to the pull it is applying to the binder, and means for thereafter moving said gripper outwardly away from the side of the shoe in predetermined time relation to the movement of said fastener inserting mechanism members toward the shoe.

22. In a machine for lasting the toe end of a shoe, means for applying a toe binder around the toe end of a shoe being lasted including a gripper, mechanism for inserting a fastener to secure the binder to the shoe including members movable toward the shoe to urge the binder into engagement with the shoe, a support for said gripper movable in a direction extending lengthwise of the shoe to cause the gripper to draw the binder against the upstanding margin of the upper to hold it in lasted position, means for mounting said gripper on its support with its operative end spaced outwardly away from the side of the shoe, said mounting means including a pair of links providing a toggle action for causing the gripper to move inwardly toward the side of the shoe in response to the pull it is applying to the binder, and means for thereafter moving said gripper outwardly away from the side of the shoe in predetermined time relation to the movement of said fastener inserting mechanism members toward the shoe.

23. In a machine for lasting the toe end of a shoe, means for applying a toe binder around the toe end of a shoe being lasted including a gripper, mechanism for inserting a fastener to secure the binder to the shoe including members movable toward the shoe to urge the binder into engagement with the shoe, a support for said gripper movable in a direction extending lengthwise of the shoe means for moving said support to cause the gripper to draw the binder against the upstanding margin of the upper to hold it in lasted position, means for mounting said gripper on its support for movement toward and away from the side of the shoe, means for yieldably urging the gripper outwardly away from the side of the shoe, said mounting means being so constructed and arranged as to cause the gripper to move inwardly toward the side of the shoe in response to the pull it is applying to the binder, and means for thereafter moving said gripper outwardly away from the side of the shoe in predetermined time relation to the movement of said fastener inserting mechanism members toward the shoe.

24. In a machine for lasting the toe end of a shoe, means for applying a toe binder around the toe end of a shoe being lasted including a gripper, mechanism for inserting a fastener to secure the binder to the shoe including members movable toward the shoe to urge the binder into engagement with the shoe, a support for said gripper movable in a direction extending lengthwise of the shoe to cause the gripper to draw the binder against the upstanding margin of the upper to hold it in lasted position, means for mounting said gripper on its support for movement toward and away from the side of the shoe, means for yieldably urging the gripper outwardly away from the side of the shoe, said mounting means including a pair of links providing a toggle action for causing the gripper to move inwardly toward the side of the shoe in response to the pull it is applying to the binder, and means for thereafter moving said gripper outwardly away from the side of the shoe in predetermined time relation to the movement of said fastener inserting mechanism members toward the shoe.

25. In a machine for lasting the toe end of a shoe, means for applying a toe binder around the toe end of a shoe being lasted including a gripper, mechanism for inserting a fastener to secure the binder to the shoe including members movable toward the shoe to urge the binder into engagement with the shoe, a support for said gripper movable in a direction extending lenthwise of the shoe, means for moving said support to cause the gripper to draw the binder against the upstanding margin of the upper to hold it in lasted position, means for mounting said gripper on its support for movement toward and away from the side of the shoe, spring means for yieldably urging the gripper outwardly away from the side of the shoe, said mounting means being so constructed and arranged as to cause the gripper to move inwardly toward the side of the shoe in response to the pull it is applying to the binder and against the resistance of said spring means, and means for thereafter moving said gripper outwardly away from the side of the shoe in predetermined time relation to the movement of said fastener inserting mechanism members toward the shoe.

26. In a machine for lasting the toe end of a shoe, means for applying a toe binder around the toe end of a shoe being lasted including a gripper, mechanism for inserting a fastener to secure the binder to the shoe including members movable toward the shoe to urge the binder into engagement with the shoe, a support for said gripper movable in a direction extending lengthwise of the shoe to cause the gripper to draw the binder against the upstanding margin of the upper to hold it in lasted position, means for mounting said gripper on its support for movement toward and away from the side of the shoe, spring means for yieldably urging the gripper outwardly away from the side of the shoe, said mounting means including a pair of links providing a toggle action for causing the gripper to move inwardly toward the side of the shoe in response to the pull it is applying to the binder and against the resistance of said spring means, and means for thereafter moving said gripper outwardly away from the side of the shoe in predetermined time relation to the movement of said fastener inserting mechanism members toward the shoe.

References Cited in the file of this patent

UNITED STATES PATENTS

| | | |
|---|---|---|
| 1,508,593 | Brothers et al. | Sept. 16, 1924 |
| 2,638,610 | Burby | May 19, 1953 |